United States Patent
Hayashi

(10) Patent No.: US 7,610,990 B2
(45) Date of Patent: Nov. 3, 2009

(54) ON-VEHICLE MOTOR CONTROL DEVICE

(75) Inventor: Jirou Hayashi, Ama-gun (JP)

(73) Assignee: DENSO Corporation, Kariya (JP)

( * ) Notice: Subject to any disclaimer, the term of this patent is extended or adjusted under 35 U.S.C. 154(b) by 537 days.

(21) Appl. No.: 11/377,356

(22) Filed: Mar. 17, 2006

(65) Prior Publication Data

US 2006/0219471 A1    Oct. 5, 2006

(30) Foreign Application Priority Data

Mar. 30, 2005    (JP)    ............... 2005-099211

(51) Int. Cl.
 *B62D 5/04*    (2006.01)
(52) U.S. Cl. ...................... 180/446; 180/443
(58) Field of Classification Search ........... 180/410, 180/443, 444, 446
See application file for complete search history.

(56) References Cited

U.S. PATENT DOCUMENTS

| | | | | |
|---|---|---|---|---|
| 3,735,220 | A * | 5/1973 | Renner et al. | .............. 318/139 |
| 6,078,155 | A | 6/2000 | Tominaga et al. | |
| 6,240,350 | B1 * | 5/2001 | Endo | .............. 701/41 |
| 6,450,287 | B1 | 9/2002 | Kurishige et al. | |
| 6,459,971 | B1 | 10/2002 | Kurishige et al. | |
| 6,513,619 | B2 | 2/2003 | Amakusa et al. | |
| 6,639,379 | B2 | 10/2003 | Matsushita et al. | |
| 6,727,671 | B2 | 4/2004 | Ito et al. | |
| 6,808,043 | B2 * | 10/2004 | Kawada et al. | .............. 180/446 |
| 6,816,765 | B2 | 11/2004 | Yamamoto et al. | |
| 6,903,524 | B2 | 6/2005 | Kifuku et al. | |
| 7,164,248 | B2 * | 1/2007 | Hayashi | .............. 318/434 |

FOREIGN PATENT DOCUMENTS

| | | |
|---|---|---|
| JP | 07-67385 | 3/1995 |
| JP | 07-67386 | 3/1995 |
| JP | 11-215876 | 8/1999 |
| JP | 11-227438 | 8/1999 |
| JP | 2000-43740 | 2/2000 |
| JP | 2000-318628 | 11/2000 |
| JP | 2002-29432 | 1/2002 |
| JP | 2003-26020 | 1/2003 |
| JP | 2003-259686 | 9/2003 |
| JP | 2005-1481 | 1/2005 |

OTHER PUBLICATIONS

Office Action dated Jul. 16, 2009 issued in corresponding Japanese Application No. 2005-099211 and an at least partial English translation thereof.

* cited by examiner

*Primary Examiner*—Lesley D Morris
*Assistant Examiner*—Jacob Knutson
(74) *Attorney, Agent, or Firm*—Nixon & Vanderhye P.C.

(57) ABSTRACT

An on-vehicle motor control device includes a power switching circuit disposed on a circuit board to supply current from a battery to a motor, a microcomputer disposed on the same circuit board that controls the power switching circuit in a PWM control mode to minimize the difference between the current supplied to the motor and a preset current. The microcomputer decreases the preset current when the battery voltage is higher than an upper limit or when both the battery voltage and the voltage of the ignition key signal are higher than respective upper limits.

8 Claims, 3 Drawing Sheets

ON-VEHICLE MOTOR CONTROL DEVICE

CROSS REFERENCE TO RELATED APPLICATION

The present application is based on and claims priority from Japanese Patent Application 2005-99211, filed Mar. 30, 2005, the contents of which are incorporated herein by reference.

BACKGROUND OF THE INVENTION

1. Field of the Invention

The present invention relates to a control device for a motor that is mounted in a vehicle.

2. Description of the Related Art

A motor control device for an on-vehicle motor usually includes a microcomputer. The microcomputer calculates a command current value that corresponds to a required torque and controls a bridge circuit of power switching elements in a pulse width modulation (PWM) control mode so as to make the difference between the command current value and the amount of detected current become zero. In this method, there is such a problem that the microcomputer may have a higher possibility to go out of control than a discrete control device if it is excessively heated.

On the other hand, the microcomputer may have to be located near the power switching elements that is mounted on the same circuit board in order to make the device compact. Therefore, microcomputer is subject to a high temperature of the power switching elements.

In case of an electric motor power steering system (EPS) that provides a driver with assisting torque, the amount of current to be supplied to a motor is calculated by a CPU according to required steering torque. If the CPU goes out of control due to an excessively high temperature, it may provide a wrong assisting torque.

JP-A-2002-67988 and JP-A-2003-335251 disclose electric motor power steering systems that can prevent the above problem by stopping the motor. However, the motor is stopped as soon as the computer goes out of control. Accordingly, the assisting torque suddenly disappears. This may frighten a driver or may give the driver a considerable shock.

SUMMARY OF THE INVENTION

It has been found that the temperature rise of the power switching elements is largely affected by battery voltage when the power switching elements are operated under a PWM control mode. If the battery voltage increases, an on-duty period is controlled to be shorter in order to maintain the same amount of the current flowing through the power switching elements during the on-duty period.

For example, Joule heat $rI^2$ is generated in the power switching element that has an on-resistance r and passes an amount of current I in a time t. On the other hand, if the on-duty period becomes one half (e.g. t/2) due to increase in the battery voltage, an amount of the current in a unit time becomes 2I. Therefore, Joule heat generated in the power switching elements in on-duty period t/2 is $r \times (2I)^2 \times \frac{1}{2} = 2rI^2$. Thus, the Joule heat increases as the battery voltage increases.

In other words, excessively high Joule heat can be controlled. if the battery voltage is detected timely.

Therefore, an object of the invention is to provide a highly reliable on-vehicle motor control device that can prevent the above problem by controlling the Joule heat to be generated in the power switching elements.

According to a main feature of the invention, a motor control device includes a power switching circuits disposed on a circuit board to supply current from a battery to an on-vehicle motor, a microcomputer disposed on the same circuit board to control the power switching circuit in a PWM control mode so that an amount of the current supplied to the motor can be equal to a preset amount of current, in which the microcomputer decreases the preset amount of current when the battery voltage is higher than an upper limit.

With this feature, the power switching circuit is prevented from generating excessive heat, and the operation of the microcomputer can be kept normal.

In the above motor control device, the on-vehicle motor may be a steer-assisting electric motor. In this case, the microcomputer preferably includes a diagnosis circuit for providing an upper limit decreasing signal if the battery voltage is higher than an upper limit thereof, a steer-assisting current calculation circuit for calculating a steering torque according to a map of the microcomputer, and an upper limit current control circuit for setting an upper limit of current and decreasing this upper limit of current by a preset value when the upper limit decreasing signal is sent from the diagnosis circuit.

The above motor control device may further includes a torque sensor for outputting a steering torque signal and an upper limit torque control circuit for setting an upper value of torque. The upper limit torque control circuit outputs the upper value of torque as a new steering torque signal if the torque signal exceeds the upper value of torque. The upper limit torque control circuit lowers the upper value of torque by a certain value when the upper limit decreasing signal is sent from the diagnosis circuit.

BRIEF DESCRIPTION OF THE DRAWINGS

Other objects, features and characteristics of the present invention as well as the functions of related parts of the present invention will become clear from a study of the following detailed description, the appended claims and the drawings. In the drawings:

DETAILED DESCRIPTION OF THE PREFERRED EMBODIMENTS

An on-vehicle motor control device according to a preferred embodiment of the invention will be described with reference to the appended drawings. Here, the on-vehicle motor control device is applied to a steer-assisting electric motor 13 of an EPS controller 1 of an electric power steering system.

Figure 1:
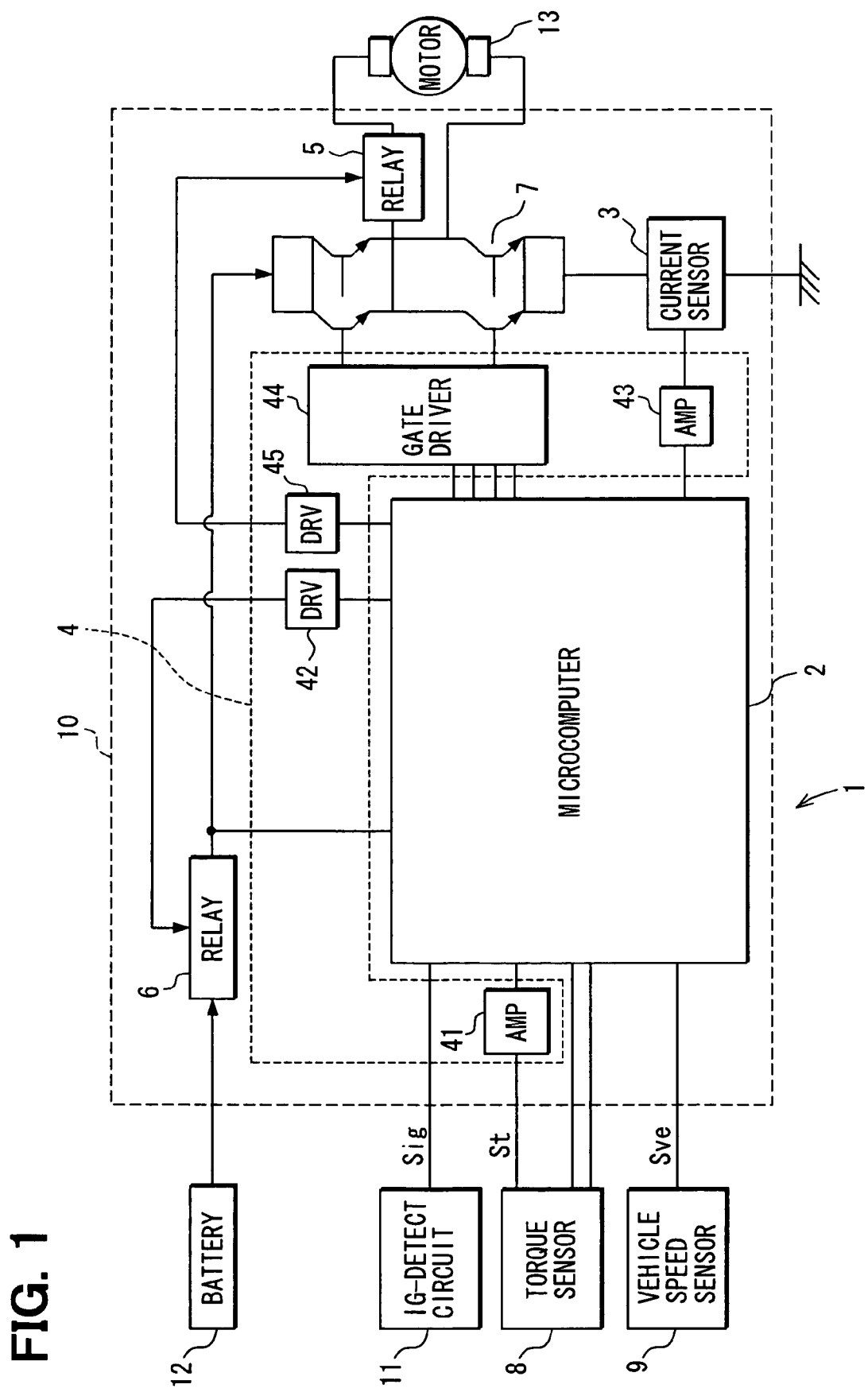
FIG. 1 is a block diagram of an electric power steering system according to a preferred embodiment of the invention.

As shown in FIG. 1, the EPS controller 1 includes a microcomputer 2, a current sensor 3, a peripheral IC unit 4, a motor relay 5, a power switching relay 6, an H-type bridge circuit 7 of power switching elements, etc, which are mounted on a circuit board 10. A torque sensor 8, a speed sensor 9, an ignition key signal (IG) detecting circuit 11, a battery 12 and the steer-assisting electric motor 13 are respectively connected to the EPS controller 1.

The current sensor 3 detects the amount of current flowing through the bridge circuit 7 of the power switching elements. The peripheral IC unit 4 is constituted of a power amplifying bipolar IC. The torque sensor 8 is mounted in the steering shaft of a vehicle to detect the steering torque of a steering wheel.

The bipolar IC includes an amplifying circuit 41, a driver 42, an amplifier circuit 43, a gate driver 44, a driver etc., in which: the amplifying circuit 41 amplifies the steering torque signal St of the torque sensor 8 and sends it to the microcomputer 2; the driver 42 amplifies a relay driving signal Sr to be supplied to a relay coil of the power switching relay 6, thereby driving the relay 6; the amplifier 43 amplifies the output signal of the current sensor 3 to be sent to the microcomputer 2; the gate driver 44 amplifies a motor driving signal (PWM signal) sent from the microcomputer 2 and sends the amplified signal to the respective power switching elements of the bridge circuit 7; and the driver 45 supplies current to a relay coil of the motor relay 5.

The microcomputer 2 is powered by the battery 12 via the power switching relay 6. The microcomputer 2 includes a plurality of A/D converters for converting analog signals, which include a battery voltage signal Sva, a vehicle speed signal Sve, a steering torque signal St sent from the amplifier 41, an IG voltage signal Sig of the IG detecting circuit 11 and a current signal Si sent from the amplifier 43, to digital signals in order to calculate an amount of motor current corresponding to a steer-assisting torque. The CPU of the microcomputer 2 calculates a command value of assisting current, which corresponds to the steering torque signal St, and provides a PWM signal having a duty-ratio of the current flowing through the switching elements of the bridge circuit 7 so that the difference between the command value and the current signal Si can be made zero. The gate driver 44 amplifies the current of the PWM signal to supply the same as motor current to the steer-assisting electric motor 13 through the bridge circuit 7.

Figure 2:
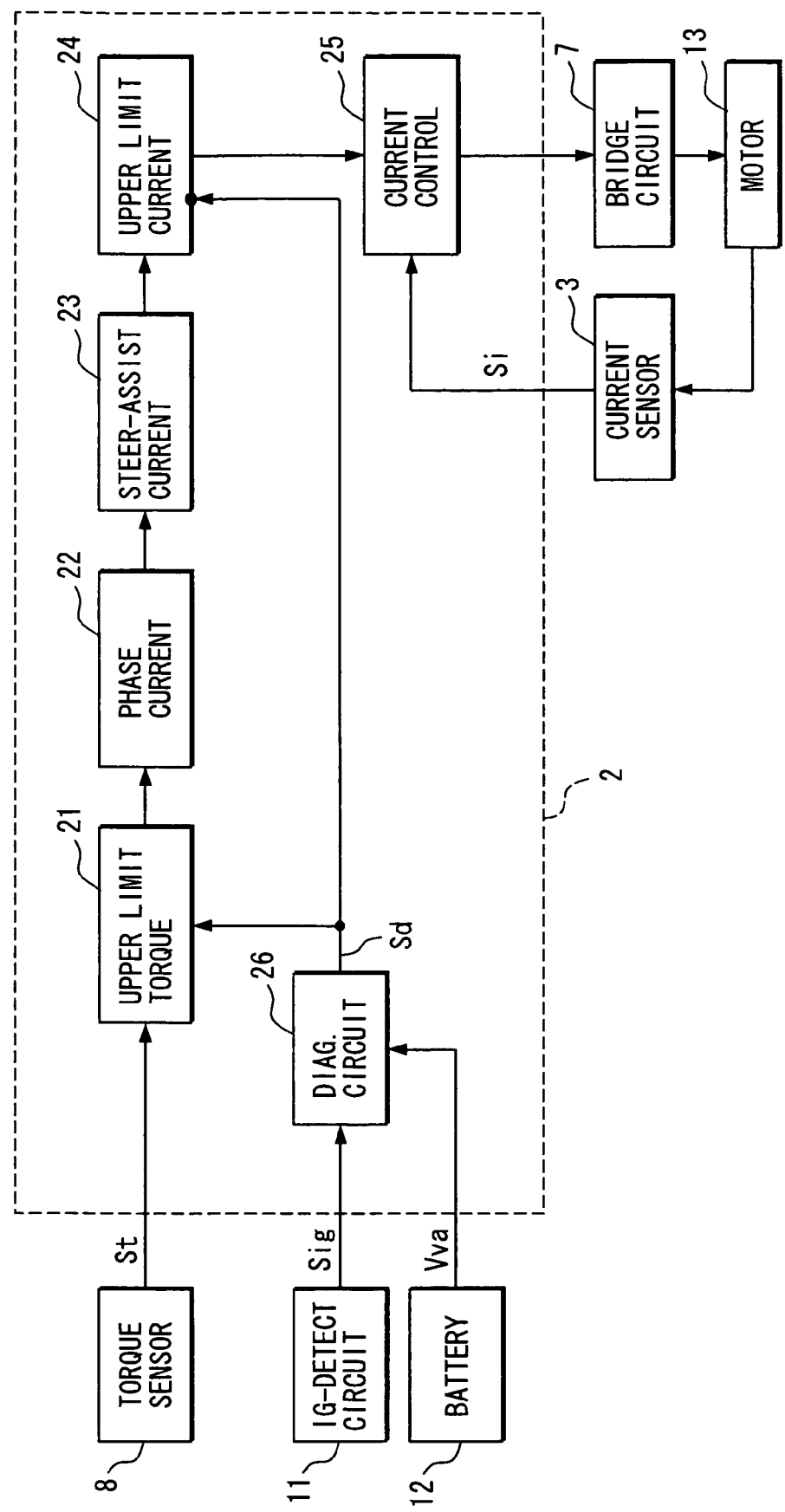
FIG. 2 is a block diagram illustrating various functions of a microcomputer mounted in the electric power control system according to the preferred embodiment.

The microcomputer 2 executes various subroutines, which are illustrated by circuits 21, 22, 23, 24, 25 and 26 shown in FIG. 2.

The analog steering torque signal sent from the torque sensor 8 is converted to a digital steering torque signal St by one of the A/D converters that is included in the microcomputer 2. Then, the upper limit of the steering torque signal St is set by an upper limit torque control circuit 21, and the phase retardation of the steering torque signal St is corrected by a phase correction circuit 22. Thereafter, a steer-assisting current value that corresponds to the steering torque signal St is provided by a steer-assisting current calculation circuit 23. The upper limit of the steer-assisting current value is set by an upper limit current control circuit 24 to be sent to a current control circuit 25.

On the other hand, the motor current is detected by the current sensor 3 and converted to a digital signal Si to be inputted to the current control circuit 25. The motor current detected by the current sensor 3 is converted by one of the computer's A/D converters to a digital signal to be sent to the current control circuit 25. The IG voltage signal Sig and the battery voltage signal Sva are sent, via a voltage dividing circuit (not shown) and one of the computer's A/D converters, to the microcomputer 2 to be examined by a diagnosis circuit 26 if each of the signals is higher than an upper limit or not. Subsequently, the result of the examinations is outputted in a logical product by the upper limit torque control circuit 21.

The phase correction circuit 22, the steer-assisting current calculation circuit 23 and the current control circuit 25, which are formed in the microcomputer 2 as subroutines, will be further described below. Incidentally, the operations of the phase correction circuit 22, the steer-assisting current calculation circuit 23 and the current control circuit 25 are common and well-known subroutines: the phase correction circuit 22 operates as a subroutine to correct the retardation of control by the microcomputer 2; the steer-assisting current calculation circuit 23 operates as a subroutine to calculate the steering torque St, which corresponds to the command value of assisting current, according to a built-in map of the microcomputer 2; and the current control circuit 25 calculates the difference between the command value of assisting current and the motor current and carries out a PI control according to the difference to obtain a PWM duty ratio, with which PWM feed back control of the bridge circuit 7 is carried out.

The upper limit of the steer-assisting current is controlled by the upper limit torque control circuit 21, upper limit current control circuit 24 and the diagnosis circuit 26. The diagnosis circuit 26 compares the IG voltage signal Sig with the upper limit thereof and also compares the battery voltage signal Sva with the upper limit thereof. If both the IG voltage signal and the battery voltage signal are equal to or higher than the upper limits thereof, the diagnosis circuit 26 sends an upper limit decreasing signal Sd to each of the upper limit torque control circuit 21 and the upper limit current control circuit 24. If one of the steering torque signals St exceed a preset upper value of torque, the upper limit torque control circuit 21 outputs this preset upper value as a new steering torque signal St. When the diagnosis circuit 26 sends the upper limit torque control circuit 21 an upper limit decreasing signal Sd, the upper limit torque control circuit 21 lowers the preset upper value of torque by a certain value. If the command value of assisting current exceeds a preset upper limit of current, the upper limit current control circuit 24 outputs this preset upper limit of current as a command signal of assisting current and decreases this preset upper limit of current by a preset value when the upper limit decreasing signal Sd is sent from the diagnosis circuit 26. The preset upper limit of current may be turned back to increase when the IG voltage signal and the battery voltage signal are by preset values (ΔSig, ΔSva) lower than the upper limits thereof, thereafter.

Figure 3:
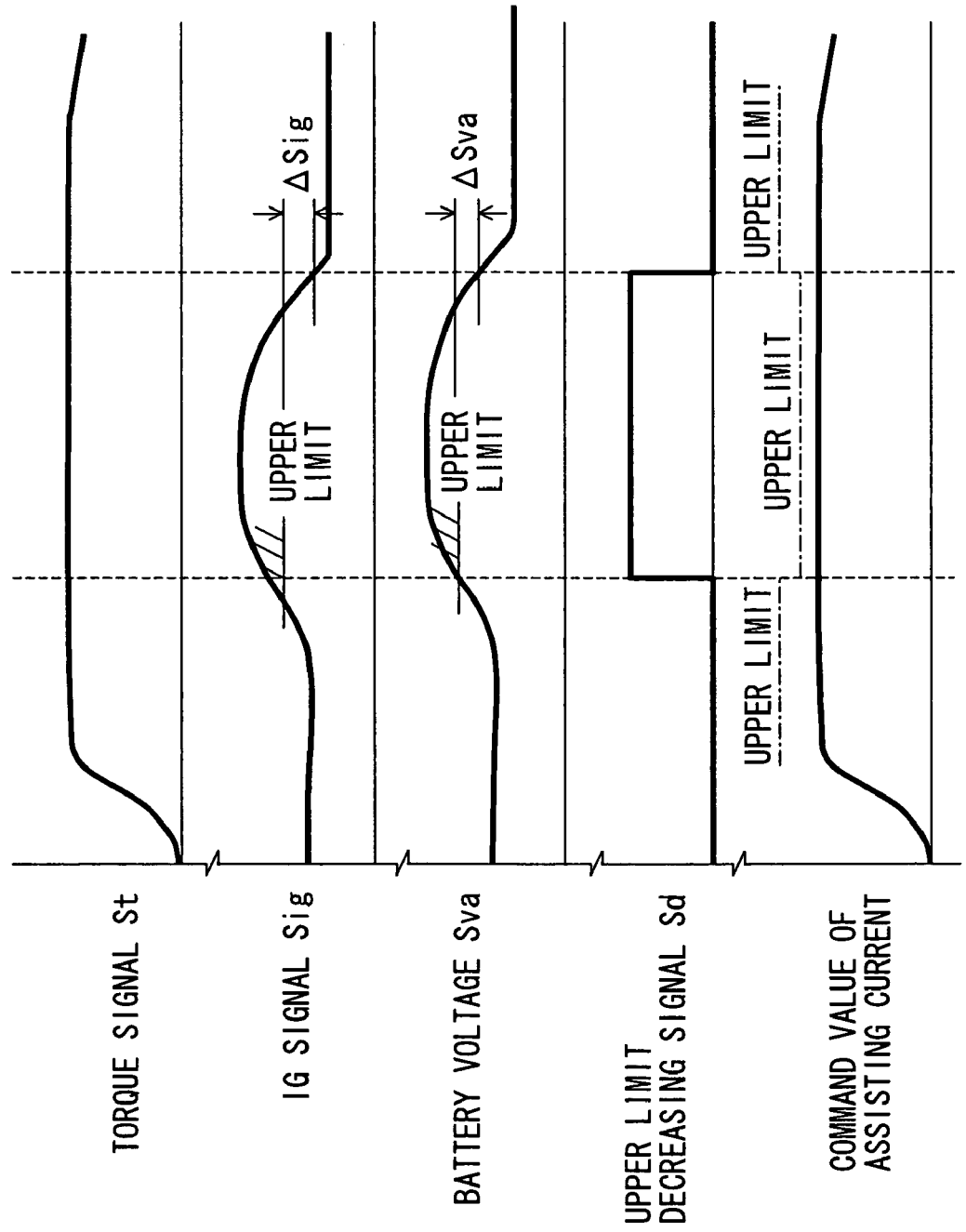
FIG. 3 is a timing diagram illustrating operation of various portions of the electric power control system according to the preferred embodiment.

Thus, if both the battery voltage and the IG voltage excessively increases, the Joule heat of the power switching elements and the motor current are appropriately controlled as shown in FIG. 3, so that the microcomputer is protected from overheating by the switching elements. Even if the microcomputer is heated by the power switching elements, the steering torque and the command value of the assisting current are limited, so that an electric power steering system can be operated without giving a driver a bad feeling or a considerable shock.

In the foregoing description of the present invention, the invention has been disclosed with reference to specific embodiments thereof. It will, however, be evident that various modifications and changes may be made to the specific embodiments of the present invention without departing from the scope of the invention as set forth in the appended claims. Accordingly, the description of the present invention is to be regarded in an illustrative, rather than a restrictive, sense.

What is claimed is:

1. A motor control device connected to a battery, said motor control device comprising:

a circuit board;

a power switching means, disposed on said circuit board for supplying current from the battery to a motor mounted in a vehicle;

a control circuit, including a microcomputer disposed near said power switching means, for controlling said power switching means in a PWM control mode so that an amount of the current supplied to the motor can be equal to a preset amount of current, wherein said microcomputer decreases the preset amount of current to an amount to prevent said microcomputer from overheating due to Joule heat of said power switching means when the voltage of the battery is higher than an upper limit.

2. The motor control device as claimed in claim 1, wherein:

the motor mounted in the vehicle is a steer-assisting electric motor; and said microcomputer comprises a diagnosis circuit for providing an upper limit decreasing signal if the battery voltage is higher than the upper limit thereof, a steer-assisting current calculation circuit for calculating a steering torque according to a map of the microcomputer, and an upper limit current control circuit for setting an upper limit of current and decreasing this upper limit of current by a preset value when the upper limit decreasing signal is sent from the diagnosis circuit.

3. The motor control device as claimed in claim 2, further comprising a torque sensor for detecting steering torque and outputting a steering torque signal and an upper limit torque control circuit for setting an upper value of torque, wherein:

said upper limit torque control circuit outputs the upper value of torque as a new steering torque signal if the torque signal exceeds the upper value of torque, and the upper limit torque control circuit lowers the upper value of torque by a certain value when the upper limit decreasing signal is sent from the diagnosis circuit.

4. A motor control device connected to a battery and an ignition key signal detecting circuit, said motor control device comprising:

a circuit board;

a power switching means, disposed on said circuit board for supplying current from the battery to a motor mounted in a vehicle;

a microcomputer, disposed on said circuit board near said lower switching means, for controlling said power switching means in a PWM control mode so that an amount of the current supplied to the motor can be equal to a preset amount of current, wherein said microcomputer decreases the preset amount of current to control Joule heat of said power switching means thereby protecting said microcomputer from overheating when both the battery voltage and the voltage of the ignition key signal are higher than respective upper limits.

5. The motor control device as claimed in claim 4, wherein:

the motor mounted in a vehicle is the steer-assisting electric motor; and said microcomputer comprises a diagnosis circuit for providing an upper limit decreasing signal if the battery voltage is higher than the upper limit thereof, a steer-assisting current calculation circuit for calculating a steering torque according to a map of the microcomputer, and an upper limit current control circuit for setting an upper limit of current and decreasing this upper limit of current by a preset value when the upper limit decreasing signal is sent from the diagnosis circuit.

6. The motor control device as claimed in claim 5, further comprising a torque sensor for detecting steering torque and outputting a steering torque signal and an upper limit torque control circuit for setting an upper value of torque, wherein:

said upper limit torque control circuit outputs the upper value of torque as a new steering torque signal if the torque signal exceeds the upper value of torque; and the upper limit torque control circuit lowers the upper value of torque by a certain value when the upper limit decreasing signal is sent from the diagnosis circuit.

7. The motor control device as claimed in claim 1, wherein the power switching means is a power switching relay.

8. The motor control device as claimed in claim 4, wherein the power switching means is a power switching relay.

* * * * *